US012704811B2

(12) United States Patent
Cusin et al.

(10) Patent No.: US 12,704,811 B2
(45) Date of Patent: Aug. 11, 2026

(54) WINDING DEVICE, IN PARTICULAR FOR A HOROLOGICAL BARREL, PROVIDED WITH A DISCONNECTABLE WINDING GEAR TRAIN

(71) Applicant: Nivarox-FAR S.A., Le Locle (CH)

(72) Inventors: Pierre Cusin, Villars-Burquin (CH); Laurent Jeanneret, Villers-le-Lac (FR)

(73) Assignee: Nivarox-FAR S.A., Le Locle (CH)

( * ) Notice: Subject to any disclaimer, the term of this patent is extended or adjusted under 35 U.S.C. 154(b) by 298 days.

(21) Appl. No.: 18/513,812

(22) Filed: Nov. 20, 2023

(65) Prior Publication Data

US 2024/0184247 A1 Jun. 6, 2024

(30) Foreign Application Priority Data

Dec. 1, 2022 (EP) .................................... 22210930

(51) Int. Cl.
*G04B 5/24* (2006.01)

(52) U.S. Cl.
CPC ..................................... *G04B 5/24* (2013.01)

(58) Field of Classification Search
None
See application file for complete search history.

(56) References Cited

U.S. PATENT DOCUMENTS

| | | | | |
|---|---|---|---|---|
| 2,623,349 A * | 12/1952 | Bridevaux | ............... | G04B 5/20 968/62 |
| 3,264,819 A | 8/1966 | Konrad | | |
| 3,878,673 A | 4/1975 | Meitinger | | |
| 10,222,745 B2 | 3/2019 | Calame et al. | | |

FOREIGN PATENT DOCUMENTS

| | | |
|---|---|---|
| CH | 264966 A | 11/1949 |
| DE | 2 302 885 A1 | 8/1974 |
| FR | 1207713 A | 2/1960 |
| JP | 2012-32299 A | 2/2012 |

OTHER PUBLICATIONS

Translation of CH264966, Espacenet (Year: 1949).*

(Continued)

*Primary Examiner* — Renee S Luebke
*Assistant Examiner* — Matthew Daniel Hwang
(74) *Attorney, Agent, or Firm* — Oblon, McClelland, Maier & Neustadt, L.L.P.

(57) ABSTRACT

A winding device, in particular for a barrel provided with a spring, including a ratchet fixedly mounted on a rotary winding shaft, the rotary winding shaft being, for example, a winding shaft of the barrel, the rotation of which winds the barrel, and a winding gear train meshing with the ratchet, the rotation of the winding gear train causing the ratchet to rotate and the rotary winding shaft to rotate by applying a torque to the ratchet, the winding gear train being movable between a coupled position wherein it drives the ratchet and a disconnected position wherein it does not drive the ratchet, the winding gear train being mounted on a spring exerting a return force on the winding gear train to keep it in the coupled position. A horological movement can include such a winding device.

8 Claims, 1 Drawing Sheet

(56) References Cited

OTHER PUBLICATIONS

Combined Russian Office Action and Search Report issued Jun. 21, 2024, in corresponding Russian Patent Application No. 2023131235/28(069265) (with English Translation and English Translation of Category of Cited Documents), 13 pages.
Office Action issued Oct. 22, 2024, in corresponding Japanese Patent Application No. 2023-198867 (with English Translation), 9 pages.
European Search Report issued Apr. 21, 2023 in European Application 22210930.8 filed on Dec. 1, 2022, 3 pages (with English Translation of Categories of Cited Documents).

* cited by examiner

WINDING DEVICE, IN PARTICULAR FOR A HOROLOGICAL BARREL, PROVIDED WITH A DISCONNECTABLE WINDING GEAR TRAIN

CROSS-REFERENCE TO RELATED APPLICATION

This application claims priority to European Patent Application No. 22210930.8 filed on Dec. 1, 2022, the entire disclosure of which is hereby incorporated herein by reference.

FIELD OF THE INVENTION

The invention relates to a winding device, in particular for a horological barrel, provided with a disconnectable winding gear train.

The invention also relates to a horological movement including such a winding device.

BACKGROUND OF THE INVENTION

Most of today's automatic winding mechanical watches generally include an oscillating mass driving a gear train by gravity, the rotation of which makes it possible to wind a blade-spring, the barrel spring, wound in a drum around a shaft, by driving said shaft. Rotation is generally forced in one direction only, and is prevented from reversing by a pawl.

However, when the spring is fully wound, it is important to avoid over-winding, which could cause the spring to break or the oscillator to knock, during which the amplitude of oscillation increases to the point where the balance comes up against the pallet horns, causing the rate to drift due to the balance rebounding against these stops.

To avoid these risks, such barrels generally have a system for limiting the winding of the barrel spring.

This limiting is usually performed by sliding the last outer coil of the spring against the inner wall of the drum. When the spring is fully wound and coiled around the barrel winding shaft, the last wound coil presses against the outer wall of the drum.

Thus, when the winding torque exceeds the friction torque against the wall of the last coil, the blade starts to slide. To prevent uncontrolled sliding, notches allow the end of the blade to stop sliding as soon as the winding torque has decreased sufficiently.

However, the disadvantage of such a system lies in the sliding-friction process of the last coil inside the drum. When the mechanism to be driven requires a high torque, the bearing forces and the friction of the spring blade against the wall are accentuated, leading to wear and a deterioration in the performance of the barrel, even in the presence of grease, which is evacuated from the friction track after a certain time.

Furthermore, in an automatic barrel, it is necessary to meet contradictory criteria to maximise efficiency, such as reduced friction between the coils, and high friction between the spring and the drum to guarantee a good winding torque.

Damage to the drum must also be avoided, such as tearing of the coating, build-up of sludge, wear of the walls under the pressure of the fully wound spring blade.

SUMMARY OF THE INVENTION

The aim of the present invention is that of remedying all or some of the above-mentioned disadvantages by providing a winding device provided with a system for limiting the winding of a spring, which replaces a system based on the sliding of a blade against notches in an inner wall of the drum.

To this end, the invention relates to a winding device, in particular for a horological barrel provided with a spring, comprising a ratchet mounted on a rotary winding shaft, the rotary winding shaft being, for example, a barrel winding shaft, the rotation of which winds the barrel, and a winding gear train meshing with the ratchet, the rotation of the winding gear train driving the rotation of the ratchet and that of the rotary winding shaft by application of a torque to the ratchet, the winding gear train being movable between a coupled position wherein it drives the ratchet and a disconnected position wherein it does not drive the ratchet.

The invention is remarkable in that the winding gear train is mounted on a spring exerting a return force on the winding gear train to hold it in the coupled position.

Thus, by moving the winding gear train into the disconnected position, the ratchet is no longer driven by the winding gear train, because the latter is no longer driven. For example, when the torque applied to the ratchet is too high, particularly when the barrel is fully wound, the winding gear train moves and no longer transmits the rotation torque to the ratchet, so that the ratchet no longer turns.

Thanks to the invention, the risks of premature wear of the barrel are avoided, as the limiting device is arranged upstream from and outside the barrel. Furthermore, the use of conventional winding limiting devices based on spring friction inside the cylinder is avoided.

According to a particular embodiment of the invention, the ratchet comprises a first peripheral toothing cooperating with a second toothing of the winding gear train, when the torque applied to the ratchet is substantially less than a threshold value.

According to a particular embodiment of the invention, the winding gear train moves into the disconnected position, when the torque applied to the ratchet substantially exceeds a threshold value, in particular when the barrel is fully wound.

According to a particular embodiment of the invention, the winding gear train meshes with a winding actuating wheel when it is in the coupled position, and does not mesh with the winding actuating wheel when it is in the disconnected position.

According to a particular embodiment of the invention, the winding gear train is arranged alongside the ratchet, and preferably extends in the same plane as the ratchet in the coupled position.

According to a particular embodiment of the invention, the winding gear train performs a lateral movement between the coupled position and the disconnected position.

According to a particular embodiment of the invention, the winding gear train performs a rotary movement to move from the coupled position to the disconnected position and vice versa.

According to a particular embodiment of the invention, the spring comprises a flexible guide forming a virtual pivot, the winding gear train being suspended by the flexible guide, the flexible guide exerting a radial return force on the winding gear train in the direction of the actuating wheel.

According to a particular embodiment of the invention, the flexible guide is provided with two uncrossed flexible blades and a rigid mobile element supporting the winding gear train, the two uncrossed flexible blades connecting the rigid mobile element to a stationary support of the winding device.

According to a particular embodiment of the invention, the ratchet is fixedly mounted on the barrel, the rotary winding shaft being the barrel winding shaft enabling the barrel spring to be wound.

The invention also relates to a horological movement comprising a barrel, the horological movement including such a barrel winding device.

BRIEF DESCRIPTION OF THE DRAWINGS

The aims, advantages and features of the present invention will become apparent from a number of embodiments given solely by way of non-limiting examples, with reference to the appended drawings wherein.

DETAILED DESCRIPTION OF THE INVENTION

Figure 1:
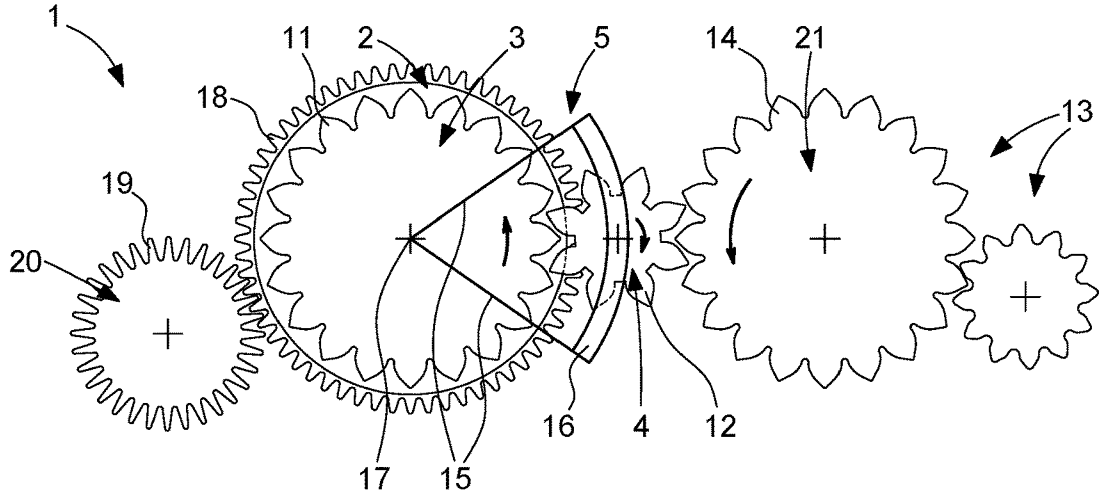
FIG. 1 schematically represents a top view of a winding device according to one embodiment of the invention, in the coupled position, FIG. 2 schematically represents a top view of the winding device according to the embodiment of the invention in FIG. 1, while the barrel is being wound, and FIG. 3 schematically represents a top view of the winding device according to the embodiment of the invention in FIG. 1, in the disconnected position, in particular when the barrel spring is fully wound.
Figure 2:
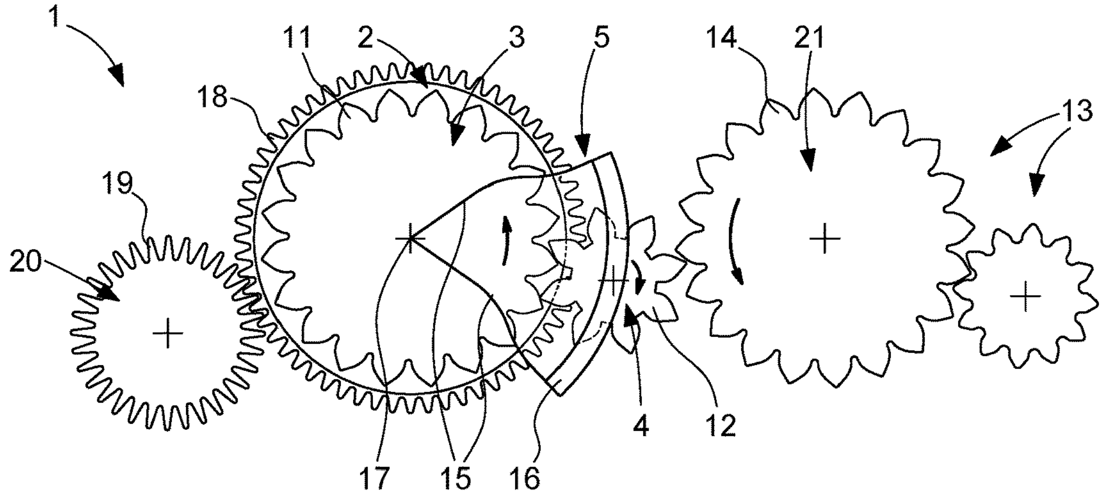
Figure 3:
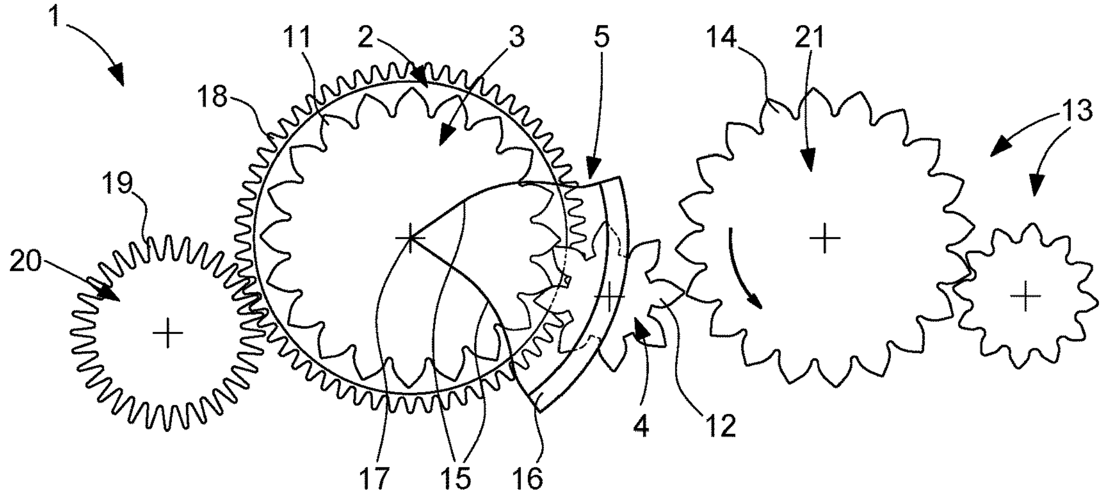

FIGS. 1 to 3 show an embodiment of a winding device 1, here a horological barrel 2, according to the invention.

The winding device 1 for the barrel 2 comprises a ratchet 3 and a winding gear train 4. The winding gear train 4 meshes with the ratchet 3, so that when the winding gear train 4 is rotated in a first direction, the ratchet 3 is rotated in a second direction opposite to the first direction.

The ratchet 3 is fixedly mounted on a winding shaft, the winding shaft enabling the barrel 2 to be wound. The winding shaft is preferably cylindrical.

In the example, the winding shaft is the winding shaft of the barrel 2, the ratchet 3 being arranged on the barrel 2. The ratchet 3 comprises a hub 7 fixedly mounted on the winding shaft.

In one variant, not shown in the figures, the winding shaft is not mounted on the barrel, the winding shaft comprising a pinion meshing with a wheel driving the barrel winding shaft to wind the spring, if the ratchet is not mounted on the barrel.

The winding gear train 4 is arranged alongside the ratchet 3, and preferably extends in the same plane as the ratchet 3.

The ratchet 3 comprises a first external toothing 11 distributed around the ratchet 3. The first toothing 11 cooperates with a second toothing 12 arranged on the winding gear train 4. The winding gear train 4 comprises a pinion provided with the second toothing 12 arranged at its periphery.

The barrel 2 includes a balance-spring (not shown in the figures), arranged inside the barrel 2, which must be wound either by an automatic winding system or by a manual winding system.

To this end, the winding device 1 also comprises a gear train system 13, for example driven by an automatic winding mass (not shown in the figures) of the horological movement. The gear train system 13 can also be driven by a winding stem (not shown in the figures) that can be operated by means of a crown, in the case of manual winding.

An actuating wheel 21 for winding the gear train system 13 comprises a third toothing 14 meshing with the second toothing 12 of the winding gear train 4. Thus, by actuating the gear train system 13, a torque is applied to the ratchet 3, which transmits it at least in part to the winding shaft via the winding gear train 4 driven by the actuating wheel 21, and via the ratchet 3 driven by the winding gear train 4.

Rotation of the winding gear train 4 causes rotation of the ratchet 3, and therefore of the winding shaft, when the barrel 2 is wound.

To avoid over-winding the barrel, the winding gear train 4 is movable between a coupled position wherein it drives the ratchet 3 and a disconnected position wherein it does not mesh with the ratchet 3.

In particular, the winding gear train 4 meshes with the winding actuating wheel 21 when it is in the coupled position, and does not mesh with the winding actuating wheel 21, when it is in the disconnected position.

Thus, in the coupled position, the actuating wheel 21 drives the winding gear train 4, and the winding gear train 4 drives the ratchet 3. In the disconnected position, however, the actuating wheel 21 rotates idly and does not drive the winding gear train 4, which is at a distance from the actuating wheel 21, so that the ratchet 3 is no longer driven by the winding gear train 4.

According to the invention, the winding gear train 4 is mounted on a spring 5 which exerts a force on the winding gear train 4 to hold it in the coupled position.

In this embodiment, the spring 5 comprises a flexible guide forming a virtual pivot, the winding gear train 4 being suspended from the flexible guide. The flexible guide is provided with two uncrossed flexible blades 15 and a rigid mobile element 16 supporting the winding gear train 4. The two flexible blades 15 connect the rigid mobile element 16 to a stationary support 17 of the winding device 1.

The stationary support 17 comprises, for example, a bearing of the ratchet 3. The flexible blades 15 join and are connected to the bearing, on one hand, and move apart to the ends of the rigid mobile element 16. The rigid mobile element 16 here has the shape of an arc of a circle.

The flexible guide exerts a radial return force on the winding gear train 40 in the direction of the actuating wheel 21.

Furthermore, the winding gear train 4 moves to the disconnected position, when the torque applied to the ratchet 3 substantially exceeds a threshold value, in particular when the barrel 2 is fully wound.

Thus, when the torque substantially exceeds a threshold value, the winding gear train performs a rotary movement to move from the coupled position to the disconnected position. The winding gear train 4 performs a lateral movement between the coupled position and the disconnected position. Furthermore, the winding gear train 4 performs a rotary movement about the virtual pivot to move from the coupled position to the disconnected position and vice versa.

Above the threshold value, when the torque required to turn the ratchet 3 is greater than that required to bend the flexible guide, the winding gear train 4 is pushed back into the disconnected position by the actuating wheel 21. In other words, when the winding gear train 4 presses hard on the ratchet 3, the rigid mobile element 16 and the winding gear train 4 move because the flexible blades 15 of the flexible guide buckle.

As a result, the actuating wheel 21 continues to rotate, but the winding gear train 4 and the ratchet 3 no longer rotate.

In FIG. 1, in the winding configuration, the winding torque exerted on the ratchet 3 is less than the threshold value, so that the winding gear train 4 remains in the coupled position and meshes with the actuating wheel 21. In this way, the ratchet 3 and the winding shaft are driven by the winding gear train 4. The first peripheral toothing 11 of the ratchet 3 cooperates with the second toothing 12 of the winding gear train 4 when the torque applied to the ratchet 3 is substantially less than a threshold value.

In FIG. 2, during winding of the barrel, when the torque increases and approaches the threshold value, the winding gear train 4 begins to move laterally thanks to the flexible guide, but it still meshes with the third toothing 14 of the actuating wheel 21. Thus, the ratchet 3 is still driven by the winding gear train 4.

In FIG. 3, when the barrel 2 is fully wound, the winding torque exerted on the ratchet 3 by the winding gear train 4 is greater than the threshold value, so that the winding gear train 4 moves completely into the disconnected position thanks to the flexible guide.

As a result, the second toothing 12 of the winding gear train 4 no longer engages with the third toothing 14 of the actuating wheel 21. As a result, the winding gear train 4 and the ratchet 3 do not rotate.

These disconnection means protect the barrel 2 from over-winding and prevent premature wear inside the barrel 2.

The barrel 2 also includes a peripheral fourth toothing 18 configured to cooperate with a fourth toothing 19 of a wheel 20 of the horological movement. The wheel 20 is, for example, an average wheel. Once wound, the barrel 2 supplies the energy required to operate the horological movement via the wheel 20.

The invention also relates to a horological movement, not shown in the figures, the movement comprising a barrel and a barrel winding device as described above.

Naturally, the invention is not limited to the embodiments described with reference to the figures, and variants could be envisaged without departing from the scope of the invention.

The invention claimed is:

1. A winding device for a barrel provided with a spring, comprising:

a ratchet fixedly mounted on a rotary winding shaft, the rotary winding shaft being a winding shaft of the barrel, a rotation of which winds the barrel, and a winding gear train meshing with the ratchet, a rotation of the winding gear train causing the ratchet to rotate and the winding shaft to rotate by applying a torque to the ratchet, the winding gear train being movable between a coupled position wherein said winding gear train drives the ratchet and a disconnected position wherein said winding gear train does not drive the ratchet, wherein the winding gear is mounted on the spring exerting a return force on the winding gear train to hold said winding gear train in the coupled position, wherein the winding gear train meshes with a winding actuating wheel when said winding gear train is in the coupled position, and does not mesh with the winding actuating wheel when said winding gear train is in the disconnected position, and wherein the spring comprises a flexible guide forming a virtual pivot, the winding wheel being suspended by the flexible guide, the flexible guide exerting a radial return force on the winding wheel in a direction of the actuating wheel.

2. The winding device according to claim 1, wherein the winding gear train moves into the disconnected position, when the torque applied to the ratchet substantially exceeds a threshold value when the barrel is fully wound.

3. The winding device according to claim 1, wherein the winding gear train is arranged alongside the ratchet, and extends in the same plane as the ratchet in the coupled position.

4. The winding device according to claim 3, wherein the winding gear train performs a rotary movement to move from the coupled position to the disconnected position and vice versa.

5. The winding device according to claim 1, wherein the winding gear train performs a lateral movement between the coupled position and the disconnected position.

6. The winding device according to claim 1, wherein the flexible guide is provided with two uncrossed flexible blades and a rigid mobile element supporting the winding gear train, the two uncrossed flexible blades connecting the rigid mobile element to a stationary support of the winding device.

7. The winding device according to claim 6, wherein the stationary support is a bearing of the ratchet.

8. A horological movement comprising:

the barrel and the winding device for the barrel according to claim 1.

* * * * *